United States Patent Office 3,483,808
Patented Dec. 16, 1969

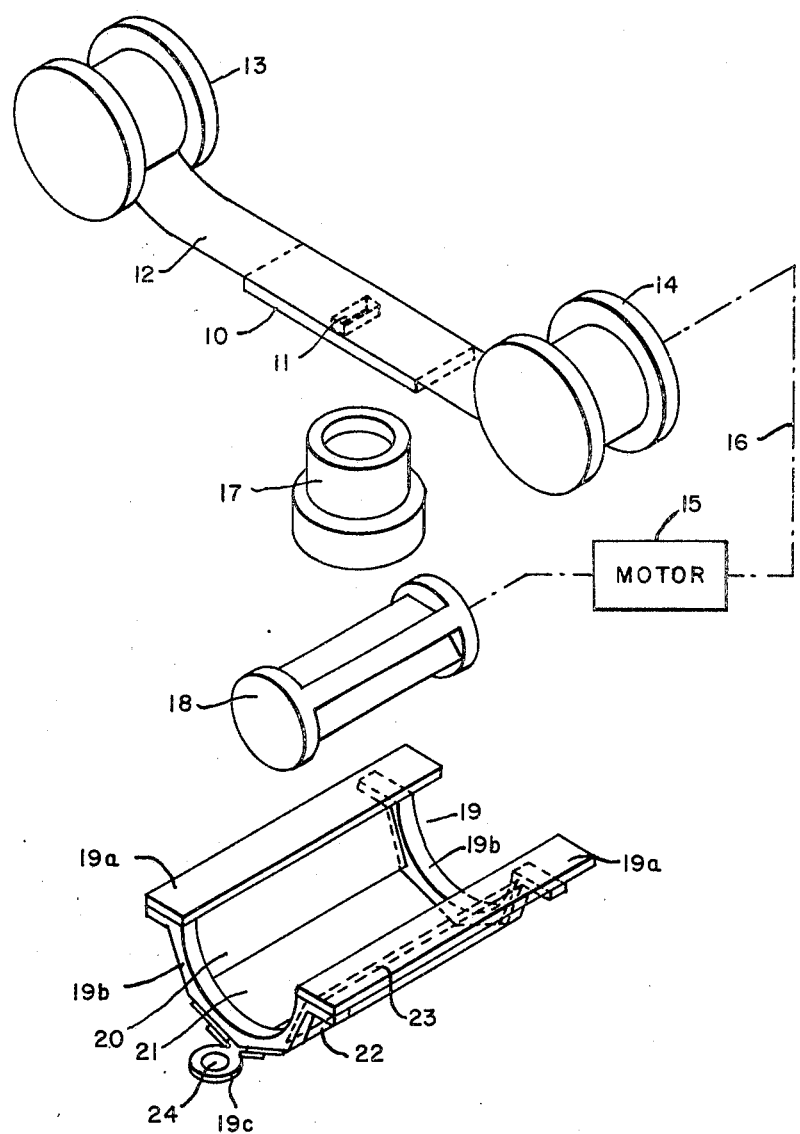

3,483,808
HAZE-FILTER ASSEMBLY FOR PANORAMIC CAMERAS
George J. Arnold, Mineola, N.Y., assignor to Fairchild Camera and Instrument Corporation, a corporation of Delaware
Filed Oct. 17, 1966, Ser. No. 587,115
Int. Cl. G03b 29/00, 37/00
U.S. Cl. 95—12.5      4 Claims

ABSTRACT OF THE DISCLOSURE

A transversely scanning panoramic or aerial camera is provided with filters having peak transmissivities in the longer wavelengths (red) when the optical system is directed toward part of the scene which is further away, or toward the horizon.

---

This invention relates to a haze-filter assembly for panoramic cameras and particularly to such an assembly for use with panoramic cameras having an optical system including, in the order named, an exposure slit across which is transported a medium to be exposed, an objective lens for focusing a field of view on the slit, and a rotatable optical scanner, It has been recognized that in aerial photography the contrast and resolution of the recorded image are often seriously degraded by atmospheric haze. Haze, or light scattering, in aerial photography is always present to some degree and is a function of the weather, terrain, solar attitude, altitude, and other conditions. The scattering of light is usually due to dust particles and water vapor in the air. The amount of this scattered light entering the camera lens raises the minimum brightness of the scene. That light which penetrates the haze and is reflected from the earth is again scattered when passing back through the haze to the camera and reduces the maximum brightness of the scene. It is the difference between such minimum and maximum brightness which determines the image contrast while resolution is a function of image contrast. The particles in the atmosphere scatter the short wavelength (blue) light to a greater degree than the long wavelength (red) light.

It is recognized that, in fixed-view cameras, such degradation of resolution by atmospheric haze can be diminished by disposing in front of the objective lens a yellow filter having a peak transmissivity at approximately 5400 A., thereby filtering out the scattered blue light and lowering the minimum brightness of the image and increasing contrast and resolution.

However, heretofore there has been provided no adequate solution to the problem of haze in connection with panoramic cameras of the type including a rotating scanner in front of the objective lens. Such a camera must photograph the terrain as it scans approximately 180° from one horizon to the other. As the degree to which the ground is obscured depends upon the depth of the haze layer, the image of the terrain directly below the aircraft will be much less degraded than the image of the far off oblique areas of the photograph. The worst condition, of course, is in the area of the horizon itself, as the camera is then scanning horizontally through almost limitless haze which, as stated above, results in reducing the contrast of this portion of the scene. Since, as stated above, blue light is scattered more than red and since the panchromatic films normally used in panoramic cameras are more sensitive to blue light than to red, the phenomena result in an apparent over-exposure and loss of resolution at the ends of the format or the horizons. However, since it is desirable to take advantage of all the light available to form the image, the use of a filter appropriate to filter out the haze at or near the horizon would unnecessarily reduce the brightness of the image when scanning portions at or near the nadir.

It is an object of the invention, therefore, to provide a new and improved haze-filter assembly for panoramic cameras which provides different degrees of haze compensation as the camera scans the terrain substantially from horizon-to-horizon.

It is another object of the invention to provide a graded set of haze-filter assemblies of the type described to compensate for different mean densities of atmospheric haze.

In accordance with the invention, there is provided in a panoramic camera optical system including, in the order named, an exposure slit across which is transported a medium to be exposed, an objective lens for focusing a field of view on the slit, and a rotatable optical scanner, a haze-filter assembly comprising a plurality of optical filter elements arranged in an array proportioned and disposed to surround the operative part of the optical scanner, the filter elements substantially displaced from the axis of the optical system having peak transmissivities at substantially longer wavelengths than those near such axis.

For a better understanding of the present invention, together with other and further objects thereof, reference is had to the following description, taken in connection with the accompanying drawing, while its scope will be pointed out in the appended claims.

Referring to the drawing:

The single figure is an exploded perspective representation, partially schematic, of the optical system of a panoramic camera and an associated haze-filter assembly embodying the invention.

Referring now more particularly to the drawing, there is represented a panoramic camera optical system including a slit plate 10 having an exposure slit 11 across which is transported a medium such as a film 12 from a supply reel 13 to a takeup reel 14. The film transport may include any conventional driving mechanism, such as that described and claimed in United States Patent No. 3,250,194 to Lysle, as represented schematically by motor 15 driving the reel 14 through a mechanism represented schematically at 16.

The optical system of the camera further includes an objective lens assembly 17 for focusing a field of view on the slit 11 and a rotatable optical scanner, for example a double-dove prism scanner 18, rotated continuously by the motor 15 in synchronism with the motion of the film transport.

The haze-filter assembly embodying the invention is shown in the exploded view immediately below the rotatable scanner 18. This assembly includes a frame member 19 including two side members 19a, 19a for attachment to the frame of the camera and a pair of approximately semicircular end members 19b, 19b. Attached to the end members 19b, 19b are four flat elongated strip filter elements 20, 21, 22, and 23 arranged in an approximately semicylindrical array and proportioned and disposed to surround the operative part of the scanner 18. Each of the filter strips 20–23 is of a material which is substantially transparent at the wavelength of its peak transmissivity. The filter elements 20 and 23, which are substantially displaced from the axis of the optical system including the objective lens 17 and, therefore, effective when scanning the terrain near the opposite horizons, have peak transmissivities at substantially longer wavelengths than the filter strips 21 and 22 nearer the optical axis, thus filtering out substantial portions of the scattered blue light, particularly near the horizons. Typically, the wavelengths of the peak transmissivities of the filters 20–23 fall within the range of ±10% of the means of such wavelengths. While there are shown two pairs of similar filters 20, 23 and 21, 22, it will be obvious that any desired number of such pairs may be used for providing graded filtering in smaller steps between the nadir and the horizon.

In accordance with another feature of the invention, a graded set of interchangeable haze-filter assemblies is provided, the units being readily interchangeable in accordance with haze conditions. While filter strip elements of a wide range of characteristics may be used in accordance with differences in atmospheric haze, there follows a tabulation of the principal characteristics of a graded set of interchangeable haze-filter assemblies suitable for use with the optical system of a panoramic camera of the type described:

| Filters | Color | Type [1] | Equivalent neutral density | Cut-off Wavelength, A. |
|---|---|---|---|---|
| Light haze: | | | | |
| 20, 23 | Yellow | 15 G | 0.45 | 5,100 |
| 21, 22 | do | Y-2 | 0.30 | 4,600 |
| Medium haze: | | | | |
| 20, 23 | Red | 25A | 0.6 | 5,800 |
| 21, 22 | Yellow | 15 G | 0.45 | 5,100 |
| Extreme haze (infrared film): | | | | |
| 20, 23 | IR | 113 | 0.45 | 7,000 |
| 21, 22 | Red | 25A | 0.3 | 5,800 |
| Color film: | | | | |
| 20, 23 | | Haze No. 1. | 0.0 | 3,000 |
| 21, 22 | | S-3 | 0.0 | 3,800 |

[1] Type number of filters commercially available from Tiffin Optical Company, Roslyn Heights, Long Island, New York.

When the filter assembly of the type described is one of a graded set of assemblies, there may be attached to one of the frame members 19b an arm 19c carrying a control filter 24. This filter may be a 0.3 neutral-density filter and will be included in the optical path of any photoelectric exposure control system provided in the camera (not shown) so that when the filter assembly is used, the automatic exposure control system will be modified accordingly to compensate for the equivalent neutral densities of the haze filters.

From the foregoing table, it is seen that the cut-off wavelengths of the filter elements of each of the several graded assemblies differ by approximately 500 A., 700 A., 1200 A., and 800 A., respectively. It will be understood that the filter strips 20–23, inclusive, will be selected with equivalent neutral densities related to the particular photographic emulsion being exposed. The values given in the foregoing table for light haze and medium haze were for a typical emulsion identified as Aerecon, Plus-X 8401.

While there has been described what is, at present, considered to be the preferred embodiment of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. In a panoramic camera optical system including in the order named an exposure slit across which is transported a medium to be exposed, an objective lens for focusing a field of view on said slit, and a rotatable optical scanner, a haze-filter assembly comprising:

a plurality of optical filter elements arranged in an array proportioned and disposed to surround the operative part of said scanner, the filter elements substantially displaced from the axis of the optical system having peak transmissivities at substantially longer wavelengths than those near such axis.

2. A haze-filter assembly in accordance with claim 1 in which each of the filter elements is in the form of an elongated strip of material substantially transparent at the wavelength of its peak transmissivity.

3. A haze-filter assembly in accordance with claim 1 in which wavelengths of peak transmissivities fall within the range of ±10% of their means wavelengths.

4. A haze-filter assembly in accordance with claim 1 including a neutral-density control filter outside the optical path of said haze filters and having a density approximately equal to the equivalent neutral densities of said haze filters.

References Cited

UNITED STATES PATENTS 2,447,724   8/1948   Weisglass.

JOHN M. HORAN, Primary Examiner

U.S. Cl. X.R.

95—15